United States Patent
Matteson

[19]

[11] Patent Number: 5,881,117
[45] Date of Patent: Mar. 9, 1999

[54] MID-LOOP FLUID LEVEL MEASURING INSTRUMENT FOR A NUCLEAR POWER PLANT

[75] Inventor: Donn Moore Matteson, South Windsor, Conn.

[73] Assignee: Combustion Engineering, Inc., Windsor, Conn.

[21] Appl. No.: 690,861

[22] Filed: Aug. 1, 1996

[51] Int. Cl.[6] .................................................. G21C 17/035
[52] U.S. Cl. ............................................. 376/258; 73/295
[58] Field of Search .................................... 376/258, 247; 73/295, 1.73; 374/54

[56] References Cited

U.S. PATENT DOCUMENTS

| | | | |
|---|---|---|---|
| 4,532,104 | 7/1985 | Wearden et al. | 376/272 |
| 4,694,693 | 9/1987 | Gerlowski | 376/258 |
| 4,709,579 | 12/1987 | Parker et al. | 376/245 |
| 4,806,277 | 2/1989 | Sakurai et al. | 376/310 |
| 5,367,546 | 11/1994 | Lau et al. | 376/310 |
| 5,541,969 | 7/1996 | Matteson et al. | 376/258 |
| 5,566,571 | 10/1996 | Kasai et al. | 376/258 |

FOREIGN PATENT DOCUMENTS

| | | |
|---|---|---|
| 0 627 615 A1 | 12/1994 | European Pat. Off. . |
| 2168153 | 6/1986 | United Kingdom ..................... 73/295 |

*Primary Examiner*—Daniel D. Wasil
*Attorney, Agent, or Firm*—John H. Mulholland; Ronald P. Kananen

[57] ABSTRACT

A measurement chamber (18) having an upper and a lower region is at substantially the same elevation as a horizontal pipe (12) having a top region and a bottom region. An equalization line (14) fluidly connects the top region of the pipe (12) to the upper region of measurement chamber (18). A sample line (16) fluidly connects the bottom region of pipe (12) to the lower region of the measurement chamber (18). Heat junction thermocouples (22) generate a signal indicative of the level of fluid in the measurement chamber (12) which is equal to the level of fluid in the pipe (12). The signal is transmitted to a remote location by line (24).

20 Claims, 4 Drawing Sheets

MID-LOOP FLUID LEVEL MEASURING INSTRUMENT FOR A NUCLEAR POWER PLANT

FIELD OF THE INVENTION

The present invention is directed to a fluid level indicator for use in a nuclear power plant. Specifically, the present invention enables a remote observer to monitor the level of water in the hot leg of a nuclear power plant when the water level must be lowered to allow maintenance but must remain high enough to continue cooling the reactor core.

BACKGROUND OF THE INVENTION

FIG. 3 is a partial diagram of a nuclear power plant incorporating the present invention. In such a power plant, fluid is continuously transferred through a closed circulation loop between a nuclear reactor vessel 40 and a steam generator 45.

During power production, the pressurized fluid absorbs heat released by the thermonuclear reaction occurring in the reactor vessel 40. The heated fluid then flows through pipe 12 which is known appropriately as the hot leg of the fluid circulation loop. The hot leg pipe 12 delivers the hot fluid to the steam generator 45.

In the steam generator 45, the fluid circulates through a heat exchanger (not shown). The heat exchanger cools the fluid and uses the heat removed from the fluid to produce steam. This steam is eventually used to drive turbines and generate electricity.

After the circulating fluid is cooled by the heat exchanger, a circulation pump (not shown) removes the fluid from the steam generator 45 through line 44 and returns it to the reactor vessel 40 via inlet 46. The fluid is then reheated in the reactor vessel 40 and the cycle repeats.

This circulation of fluid is critical for the operation of the power plant in several respects. Not only does the circulating fluid deliver heat energy to the steam generator where the energy can be used to generate electricity, but the circulating fluid also acts as a coolant that prevents the reactor core in the reactor vessel 40 from over-heating.

Nuclear power plant systems, especially steam generators, require periodic maintenance. In particular, the fluid circulation system must be inspected for potential failures and nozzle dams must be installed and removed from the steam generator to allow inspection and mantenance to be performed in a dry environment.

In order to install and remove the nozzle dams, the fluid must be drained from the steam generator 45. This requires lowering the fluid level in the circulation loop, and consequently in the hot leg pipe. During such a maintenance period, the fluid continues to be heated by the reactor vessel 40, but is cooled by an alternate heat exchanger (not shown).

For safety reasons, it is important to know fairly accurately the level of fluid in the circulation loop during such a maintenance period. If the fluid level is not sufficiently lowered, workers performing the nozzle dam installation and removal in the steam generator 42 may be flooded. On the other hand, if the fluid level is reduced too much, the fluid will be unable to cool the reactor vessel 40 adequately.

Because the hot leg pipe is substantially in a horizontal plane and is directly connected to the reactor vessel 40, it is an ideal part of the circulation loop in which to monitor fluid level during system maintenance. Previous methods of monitoring the fluid level in nuclear power plants have proven inadequate. Such methods have either failed to provide a sufficiently accurate measurement of the fluid level or do not allow the fluid level to be monitored from a remote location, such as the power plant control room 48, where other safety equipment and parameters of the plant operation need to be monitored during maintenance periods.

SUMMARY OF THE INVENTION

The primary object of the present invention is to provide an apparatus that can accurately and continuously measure the level of fluid in the hot leg pipe of a fluid circulation system in a nuclear power plant.

It is a further object of the invention that the measurement of the level of the fluid can be monitored from a remote location such as a control room.

It is another object of the invention that the monitoring can be performed during all periods of plant operation and maintenance.

It is still another object of the invention that a measurement system can be permanently installed on the hot leg pipe.

It is yet another object of the invention to have a fluid level measurement system that can selectively be isolated from the hot leg pipe.

Additional objects, advantages and novel features of the invention will be set forth in the description which follows or may be learned by those skilled in the art through reading these materials or practicing the invention. The objects and advantages of the invention may be achieved through the means recited in the attached claims.

In fulfillment of these and other objects, the mid-loop fluid level monitor of the present invention comprises a remote chamber fluidly connected to the hot leg pipe for measurement of the level of fluid in the fluid circulation system.

In particular, a remote tank forming a measurement chamber is located at an elevation substantially the same as that of the hot leg pipe. A sample line extends from the bottom of the hot leg pipe to the lower region of the measurement chamber and an equalization line extends from the top of the hot leg pipe to the upper region of the measurement chamber. The result is that the level of fluid in the measurement chamber is essentially the same as the level of fluid in the pipe.

Inside the measurement chamber are means, such as heated junction thermocouples, for measuring the level of fluid in the measurement chamber. It is also possible to use other fluid level measurement systems.

Isolation valves are located on each of the sample and equalization lines to allow isolation of the measurement chamber from the hot leg pipe. When the power plant is operating to generate electricity, these isolation valves allow maintenance of the fluid level monitor in the measurement chamber without any disruption of the plant operation. These isolation valves can also be used to protect the fluid level monitor in the measurement chamber from the pressure and heat of the fluid traveling through the hot leg pipe when the plant is in full operation.

In addition, because the fluid level in the measurement chamber will be equivalent to the fluid level in the hot leg pipe so long as the measurement chamber and hot leg pipe are at substantially the same elevation, the measurement chamber and the fluid level monitor can be located at a remote distance from the hot leg pipe. This allows the measurement chamber to be located in some easily accessible place to further facilitate maintenance of the fluid level monitor.

BRIEF DESCRIPTION OF THE DRAWINGS

The accompanying drawings illustrate the present invention and are a part of the specification. Together with the following description, the drawings demonstrate and explain the principles of the present invention. In the drawings.

DETAILED DESCRIPTION OF THE PREFERRED EMBODIMENTS

Figure 1:
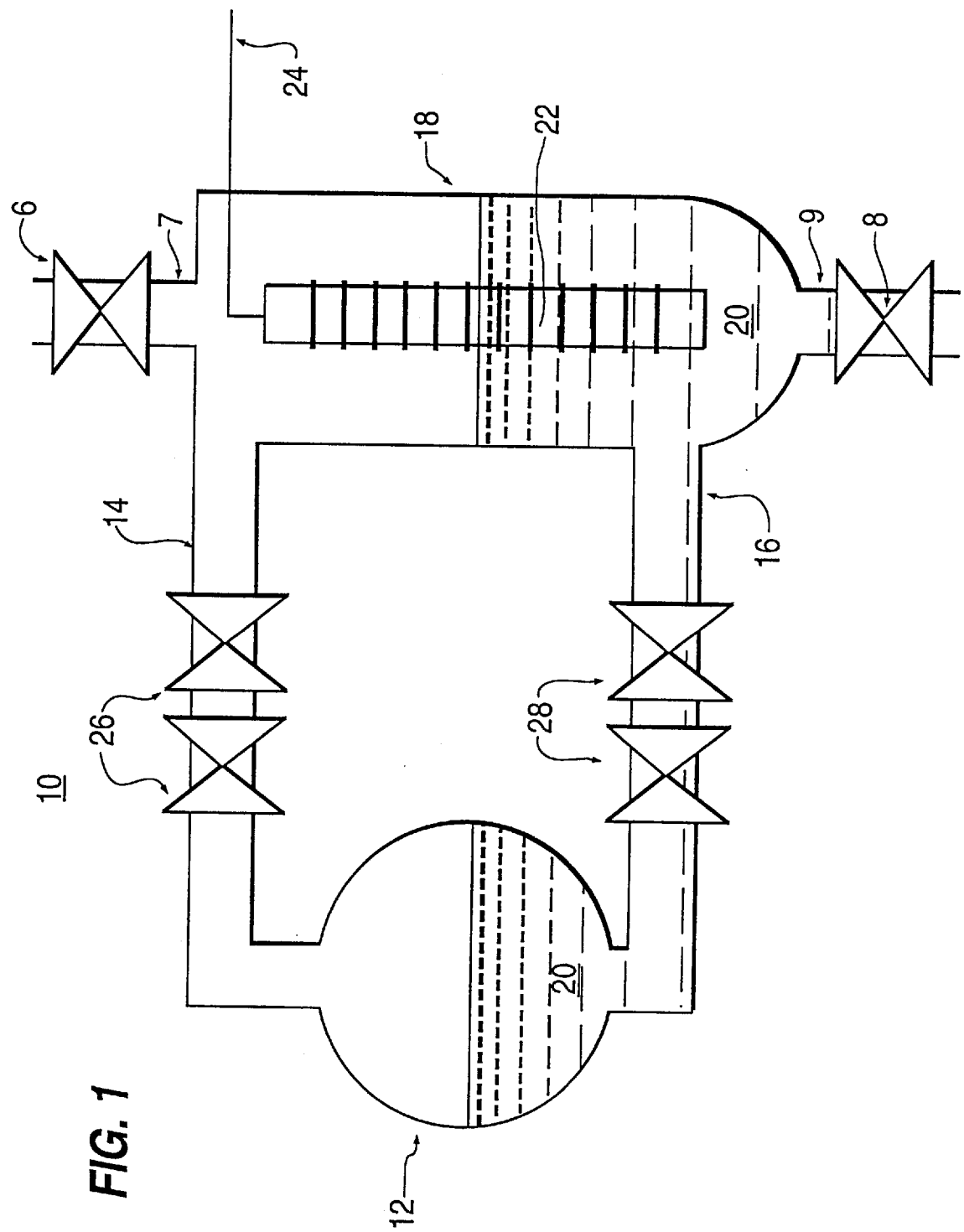
FIG. 1 is a partial cross-sectional view of the mid-loop fluid level monitor.

FIG. 1 is a partial cross-sectional view of a mid-loop fluid level monitor 10 connected to the hot leg pipe 12 of a fluid circulation system in a nuclear power plant. A measurement chamber 18 is placed at substantially the same elevation as the hot leg pipe 12 and is connected to the hot leg pipe 12 by an equalization line 14 and a sample line 16 both made from stainless steel.

Preferably, the measurement chamber 18 is cylindrical, made from stainless steel, approximately three to six feet long, and twelve to sixteen inches in diameter with a flat top and a hemispherical bottom. The hemispherical bottom is to facilitate draining. The optimal diameter of the chamber 18 depends on the type of fluid level monitor to be used. The optimal length of the chamber 18 depends on whether the sample and equalization lines run directly to the hot leg pipe 12 or are connected to branch pipes that are in turn connected to the hot leg pipe 12 (See FIG. 2).

The bottom of the measurement chamber 18 includes a drain pipe 9 controlled by a valve 8. Preferably, the drain pipe exits vertically from the center of the hemispherical bottom of the chamber 18. Draining and flushing the chamber regularly will prevent the accumulation of residue. The top of the measurement chamber 18 may include a vent line 7 controlled by a valve 6. The vent line 7 may be opened to vent the measurement chamber 18 to atmospheric pressure.

The equalization line 14 forms a fluid connection from the top region of the hot leg pipe 12 to the upper region of the measurement chamber 18 to equalize the air pressure in the pipe 12 and chamber 18. The sample line 16 fluidly connects the bottom region of the hot leg pipe 12 to the lower region of the measurement chamber 18 to allow fluid to flow from the hot leg pipe 12 to the measurement chamber 18.

Preferably, the sample line 16 is connected to the measurement chamber 18 just above the hemispherical bottom in a line tangential to the body of the chamber 18. The tangential line should pass to the left of the chamber 18 for power plants in the northern hemisphere and to the right for power plants in the southern hemisphere. This allows the natural Coriolis force created by the earth's rotation to aid in draining and flushing the measurement chamber 18.

A fluid 20 is shown partially filling the hot leg pipe 12 and the measurement chamber 18. A fluid level indicator is located in measurement chamber 18. In the preferred embodiment of the invention, the fluid 20 is water and the fluid level indicator is a water level monitor 22.

The equalization line 14 must be large enough to ensure that a substantially equal air pressure exists in the measurement chamber 18 and the hot leg pipe 12. If the air pressure varies significantly between the measurement chamber 18 and the hot leg pipe 12, the water level in the measurement chamber 18 will be different than the water level in the hot leg pipe 12.

If the air pressure throughout the system is substantially the same and measurement chamber 18 is at substantially the same elevation as hot leg pipe 12, the water in the measurement chamber 18 will rise to the same level as the water in the hot leg pipe 12. Thus, by monitoring the water level in the measurement chamber 18 with the water level monitor 22, the water level in the hot leg pipe 12, and in the water circulation system in general, may be determined.

However, when the hot leg pipe 12 is completely filled with water, an equalized air pressure will not be possible and the water level monitor 22 will be unable to provide accurate monitoring. In this case, the measurement chamber 18 may be isolated by valves 26 and 28, although this is not essential.

The water level monitor 22 is comprised of closely spaced heated junction thermocouples (HJTCS) that indicate by temperature gradient the level of water in the measurement chamber 18.

An HJTC comprises a thermocouple surrounded by a heater wire. The heater wire provides heat that is dissipated into the surrounding environment. The heat from the heater wire thus raises the temperature of the surrounding environment and the thermocouple. The electrical properties of the thermocouple vary in proportion to temperature. The thermocouple can thus provide an electrical signal indicative of temperature.

As used in the present invention, each thermocouple and its accompanying heater wire are either in an environment of steam or water depending on the water level in the measurement chamber 18. The heater wire will raise the temperature of the associated thermocouple more if the wire and thermocouple are in steam than if surrounded by water.

To determine whether a thermocouple is in steam or water, the electrical properties of the thermocouple are compared to the properties of a reference thermocouple which is not associated with a heater wire but which is in close proximity to the thermocouple that is. If the thermocouple associated with the heater wire is in steam, the difference between that thermocouple and the reference thermocouple will be greater than if the thermocouple and heater wire are in water. The results of this comparison will enable a determination of whether the thermocouple associated with the heater wire is surrounded by steam or water. Thus, if the elevation of the thermocouple is known, information about the water level is obtained.

In an alternate embodiment, two reference thermocouples are used. One is located at the top of the water level sensor 22 in measurement chamber 18 and the other is located at the bottom of sensor 22. Normally, the upper reference sensor will be in steam, while the lower reference sensor will be underwater. Thus, a determination of whether any thermocouple is in steam or water can be made by comparing its electric properties to the two reference thermocouples. This embodiment decreases the required number of reference thermocouples and the associated electrical wires.

By arranging a plurality of HJTCs vertically at known heights within the measurement chamber 18, as shown in FIG. 1, and by determining which of them are in water and which are above water and surrounded by steam, the water level In the measurement chamber 18, and in the circulation system as a whole, can be determined with a high degree of accuracy. In the preferred embodiment twelve HJTCs are used with the top and bottom HJTC comprising reference thermocouples.

Spacer disks are mounted on a support tube within the measurement chamber 18 which separate the HJTCs vertically by, for example, one inch. With the spacer disks between HJTCs and radial spacing of the HJTCs around the disks, sufficient distance is provided to ensure that the thermocouple of one HJTC is not affected by the heater wire of another HJTC.

Figure 4:
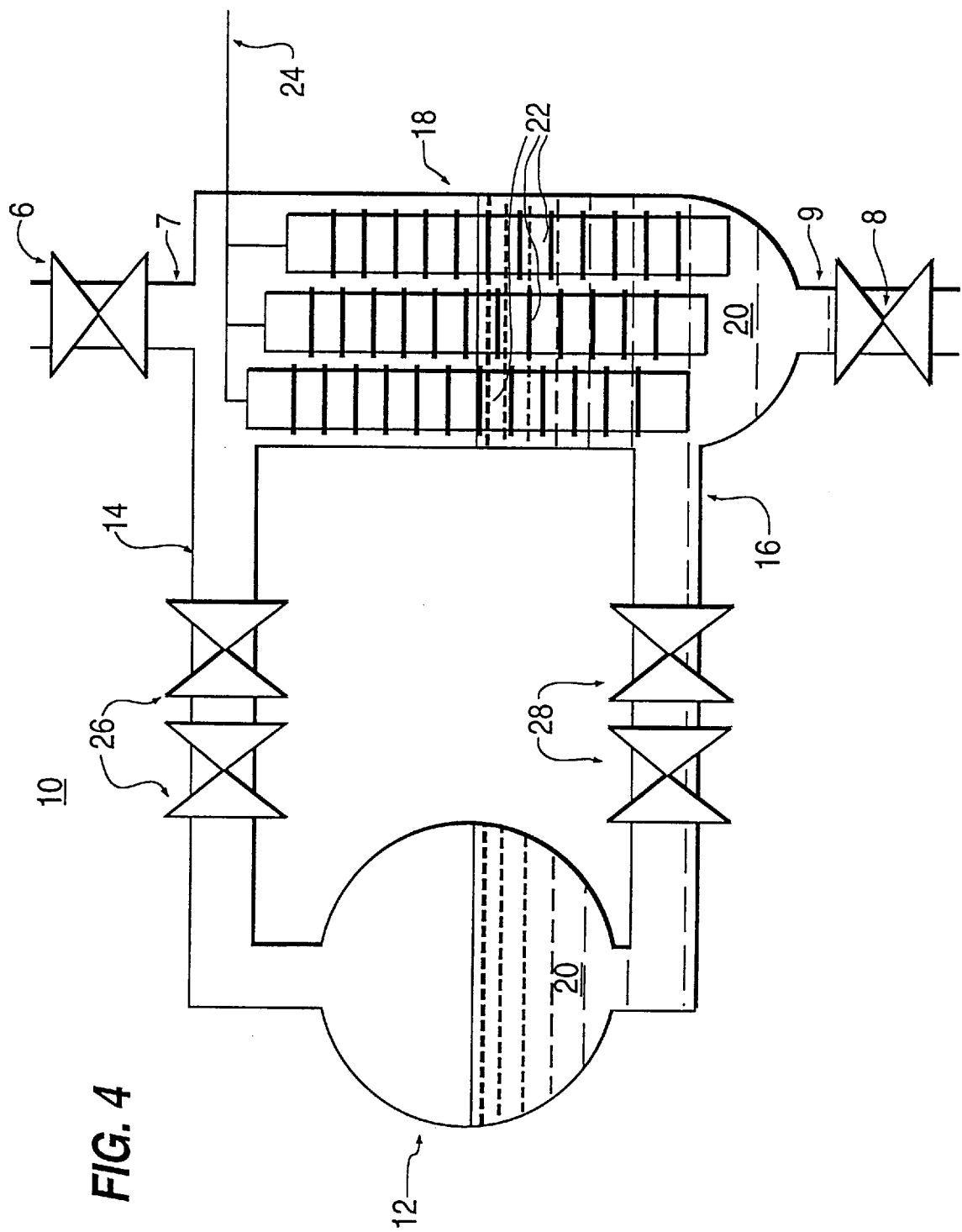
FIG. 4 is a partial cross-sectional view of the mid-loop fluid level monitor comprising a plurality of fluid level monitors.

As shown in FIG. 4, more precise measurements of the water level within the circulation system may be obtained if the water level monitor 22 comprises a plurality of columns of HJTCs. In each column, the individual HJTCs continue to be situated at known heights and separated by at least an inch. However, by staggering the heights of the columns, and thus the heights of the individual HJTCs, a more accurate measurement of the water level may be obtained. Just at the HJTCs must be vertically spaced, the staggered columns of HJTCs must be far enough apart to prevent the heater wires of each HJTC from affecting the thermocouple in an adjacent HJTC.

A signal from the HJTCs indicative of the water level in the measurement chamber 18 is transmitted to a remote location along line 24. HJTCs are preferred because they are capable of continuing to function normally and are not damaged by the system pressures (approximately 50 psi) and temperatures (70° F. to 212° F.) that occur in the water circulation loop during the operation of a nuclear power plant.

Since it may be difficult to achieve precisely equal elevations for both the hot leg pipe 12 and the measurement chamber 18, an adjustable spacer may be provided to adjust the elevation of the water level sensor 22 within the measurement chamber 18. Individual HJTCs should be located at specific heights with an error tolerance of ±0.125 inches.

In the preferred embodiment of the invention, the fluid level monitor 10 further comprises isolation valves 26, 28 along the equalization line 14 and sample line 16, respectively. These valves can be used to selectively isolate the measurement chamber 18 from the hot leg pipe 12. This allows maintenance to be performed on measurement chamber 18 while the power plant is operating and pressurized hot water is running through hot leg pipe 12. Preferably, valves 26 and 28 are each a series of two solenoid valves that may be remotely actuated.

The measurement chamber 18 may be located at a remote location from the hot leg pipe 12, as long as that location is at substantially the same elevation as the hot leg pipe 12. The measurement chamber 18 can even be located in a completely separate room from the hot leg pipe 12. Preferably the measurement chamber 18 is mounted on a biological shield wall and is separated from the hot leg pipe by the shield wall. Alternatively, the measurement chamber 18 could be mounted on a seismically stable platform some distance from the biological shield wall.

The preferred location for connecting the equalization line 14 and the sample line 16 to the hot leg pipe 12 is at substantially the longitudinal middle of the hot leg pipe 12. Such a connection provides the best indication of the water level in the hot leg pipe 12.

Some nuclear power plant systems comprise more than one hot leg pipe. In such a nuclear power plant system, one measurement chamber 18 should be provided for each hot leg pipe 12.

Other types of water level monitoring means may be used instead of a column or columns of HJTCs in the measurement chamber 18 of the present invention. For example: a float sensor, a pressure differential (Delta-P) sensor or an ultrasonic sensor may be used.

Figure 2:
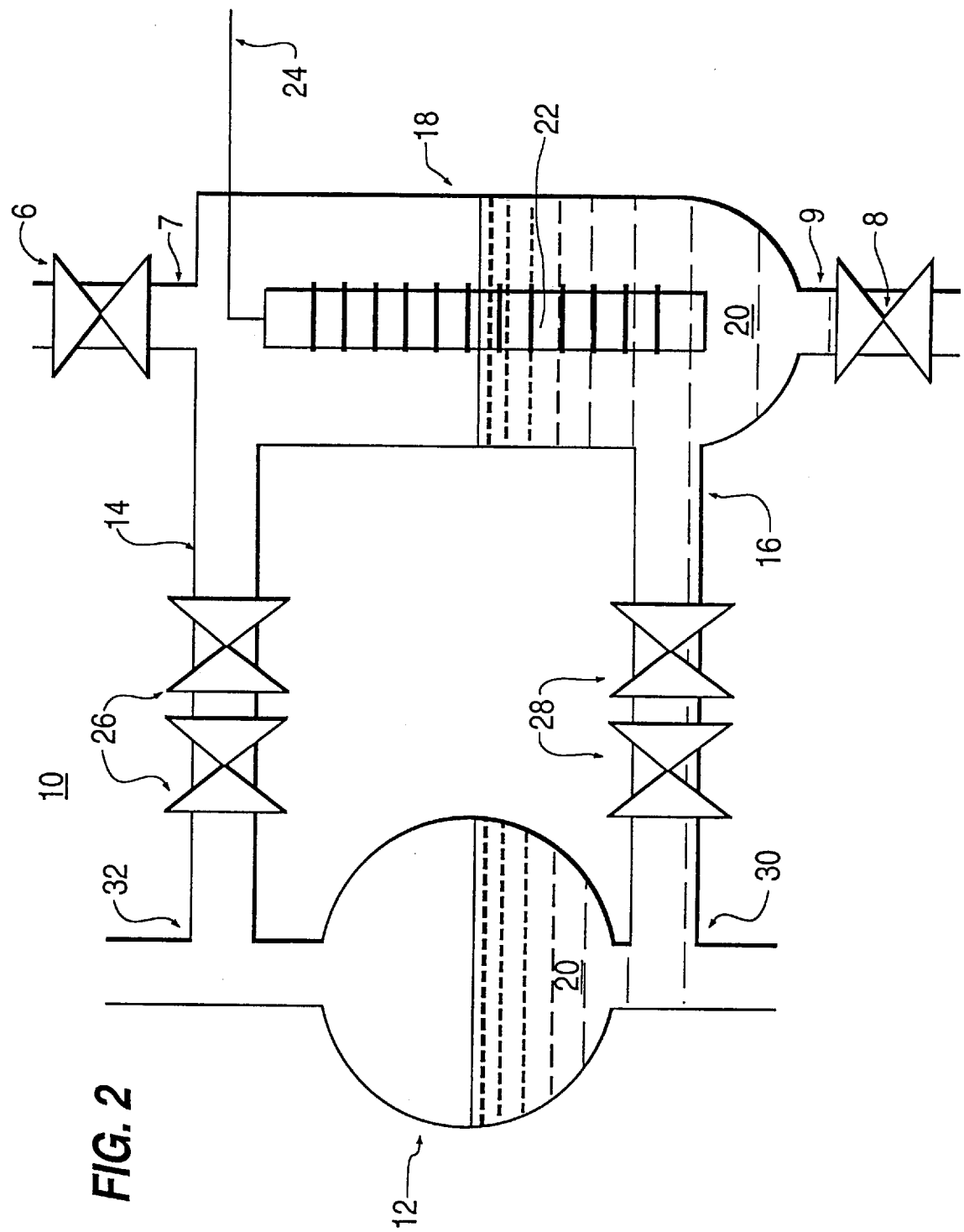
FIG. 2 is the mid-loop fluid level monitor of FIG. 1 connected to branch lines of the hot leg pipe.

FIG. 2 is a partial cross section of a second preferred embodiment of the fluid level monitor 10 of the present invention. This second embodiment is similar to the embodiment illustrated in FIG. 1, however, the measurement chamber 18 is not directly connected to the hot leg pipe 12. Instead, secondary pipes 30 and 32 are connected to the hot leg pipe 12, and the equalization line 14 and the sample line 16 connect the measurement chamber 18 with the secondary pipes 30 and 32 as shown in FIG. 2.

The sample line 16 may be directly connected to any lower secondary pipe which is connected to the bottom of hot leg pipe 12. Such a pipe may already exist in a water circulation system, for example, a shutdown cooling line. Similarly, the equalization line 14 may be connected to any secondary upper pipe 32 which is connected to the top of the hot leg pipe 12, for example, the surge line.

As with the first preferred embodiment, the equalization line, and the secondary pipe to which it is connected, must be large enough to ensure an equivalent air pressure in the hot leg pipe 12 and the measurement chamber 18. Also, isolation valves 26 and 28 may isolate the measurement chamber 18 from the rest of the hot water system for the same purposes as described in the first preferred embodiment.

Figure 3:
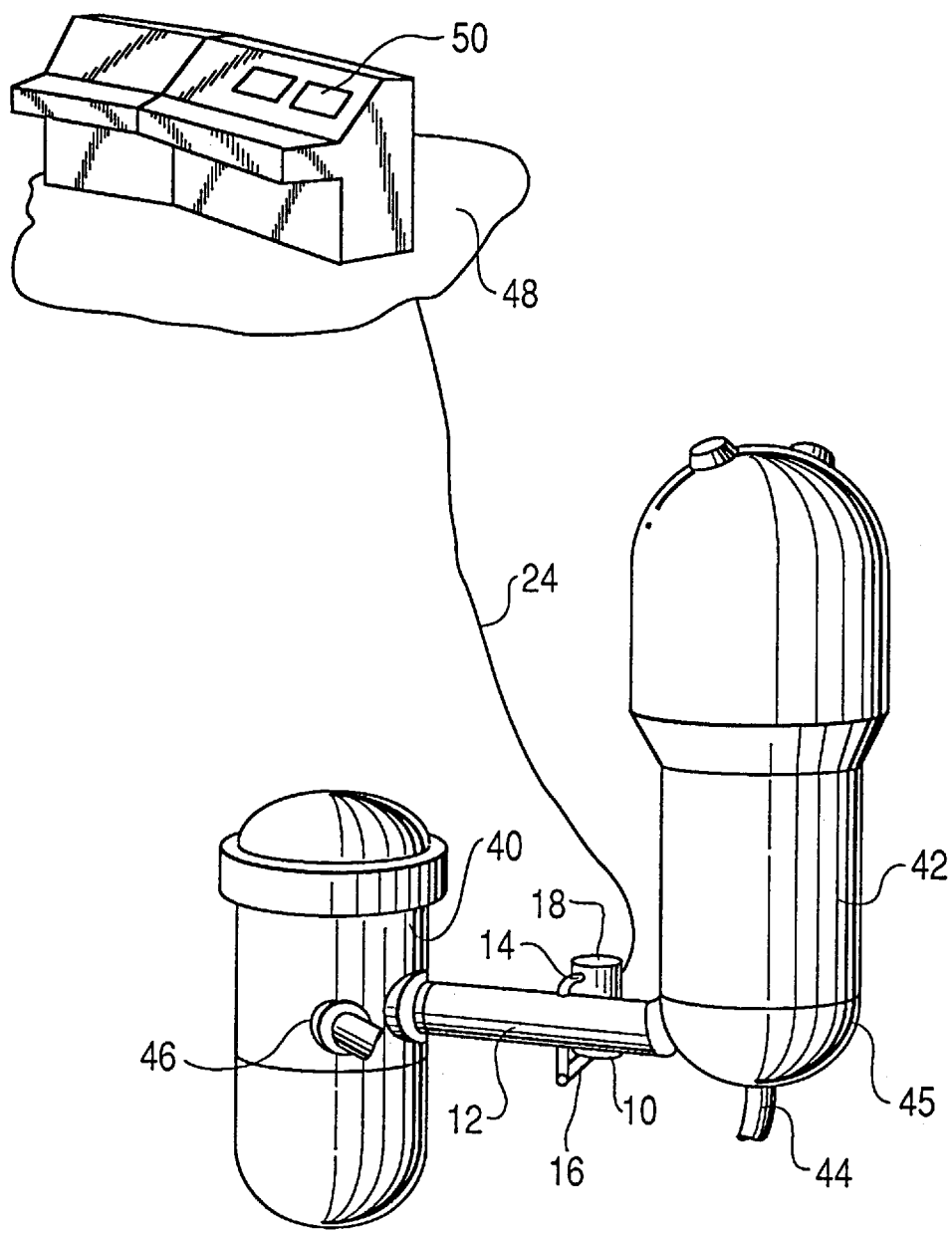
FIG. 3 is an illustrative view of the mid-loop fluid level monitor of FIG. 1 in a nuclear power plant.

FIG. 3 is a partial diagram of a nuclear power plant which includes the present invention. The mid-loop fluid level monitor 10, comprising the measurement chamber 18, the equalization line 14 and the sample line 16, is connected substantially midway along the hot leg pipe 12. The hot leg pipe 12 connects the reactor vessel 40 to the steam generator 42.

Water is heated in the reactor core within vessel 40 and travels through the hot leg pipe 12 to the steam generator 42. Steam is generated in the steam generator 42 by applying the hot water from the reactor vessel to a heat exchanger (not shown) comprising a secondary water circulation loop. The water, cooled by the heat exchanger, then leaves the steam generator 42 by line 44, travels through a pump (not shown) and returns to the reactor vessel 40 by inlet 46. The path of the water is thus a closed circulation loop.

It is necessary during down times of the power plant to perform maintenance inside the steam generator 42, particularly in the lower head 45. Because of the orientation of the reactor vessel 40 and the steam generator 42, the hot water pipe is in a substantially horizontal position at an elevation such that the upper region of pipe 12 aligns with a portion of head 45.

The result is that even small increases in the level of water in the pipe 12 can result in flooding of the bottom of the steam generator 42. Likewise a small decrease in the water level leaves insufficient water in the circulation system to adequately cool the reactor core in the reactor vessel 40. Adequate cooling of the reactor core is critical.

Moreover, if the level of water in the hot leg pipe 12 drops too low, the shutdown cooling suction pumps (not shown) will form a vortex of cooling water while drawing the water from the hot leg pipe 12. This vortex reduces the cooling flow of the water. As a result, the core appears to be adequately covered with water, but the reduced flow caused by the vortex may allow the core to over-heat.

Because of the necessity of keeping the reactor core from over-heating, it is important that operators in the control room 48 be able to monitor the level of water in the circulation system even during shutdown periods. Accordingly, the signal indicative of the water level from the mid-loop water level monitor is transmitted along line 24 to control panel 50 where the information is displayed. This allows an operator in the control room 48 to completely monitor the water level in the circulation system even during a shutdown period and to control the monitoring system. The signal indicative of the water level can also be transmitted to a computer for integration into a plant safety monitoring and display system.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A fluid level monitor comprising:
    a main pipe having an upper region and a lower region;
    a measurement chamber which is situated at substantially the same elevation as the main pipe and which has an upper region and a lower region;
    an equalization line which fluidly connects the upper region of the main pipe to the upper region of the measurement chamber and which equalizes air pressure in the main pipe and the measurement chamber;
    a sample line which fluidly connects the lower region of the main pipe to the lower region of the measurement chamber, such that a fluid level is established in the measurement chamber at the same elevation as a fluid level in the main pipe;
    a drain line connected to the lower region of the measurement chamber;
    a valve controlling the drain line; and
    means in the measurement chamber for generating a signal indicative of the fluid level.

2. The fluid level monitor of claim 1, further comprising means for transmitting the signal to a remote location.

3. The fluid level monitor of claim 2, wherein the remote location is a control room of a nuclear power plant.

4. The fluid level monitor of claim 1, wherein the equalization line and the sample line each comprise valve means for selectively isolating the measurement chamber from the main pipe.

5. The fluid level monitor of claim 4, wherein said valve means comprise a series of two valves.

6. The fluid level monitor of claim 4, wherein said valve means may be remotely actuated.

7. The fluid level monitor of claim 1, wherein the means for generating a signal indicative of the level of fluid in the measurement chamber comprises a column of vertically spaced heated junction thermocouples each situated at a predetermined elevation.

8. The fluid level monitor of claim 7, wherein the means for generating a signal indicative of the level of fluid in the measurement chamber comprises a plurality of columns of vertically spaced heated junction thermocouples, each heated junction thermocouple being situated at a predetermined elevation.

9. The fluid level monitor of claim 8, wherein each heated junction thermocouple is situated at a different elevation.

10. The fluid level monitor of claim 1, wherein the lower region of the measurement chamber is a hemisphere.

11. The fluid level monitor of claim 1, further comprising:
    a vent line connected to the upper region of the measurement chamber for controlling air pressure in the measurement chamber; and
    a valve controlling the vent line.

12. The fluid level monitor of claim 1, further comprising:
    a secondary upper pipe in fluid connection with the upper region of the main pipe; and
    a secondary lower pipe in fluid connection with the lower region of the main pipe;
    wherein the equalization line fluidly connects the secondary upper pipe to the upper region of the measurement chamber; and
    wherein the sample line fluidly connects the secondary lower pipe to the lower region of the measurement chamber.

13. The fluid level monitor of claim 12, wherein the secondary upper pipe is a surge line.

14. The fluid level monitor of claim 12, wherein the secondary lower pipe is a shutdown cooling line.

15. The fluid level monitor of claim 10, wherein the sample line connects to the measurement chamber just above the hemispherical lower region.

16. The fluid level monitor of claim 11, wherein the lower region of the measurement chamber is a hemisphere.

17. The fluid level monitor of claim 16, wherein the sample line connects to the measurement chamber just above the hemispherical lower region.

18. A fluid level monitor for using in a nuclear power plant comprising:
    a main pipe, having an upper region and a lower region, which fluidly connects a reactor vessel and a steam generator;
    a measurement chamber which is situated at substantially the same elevation as the main pipe and which has an upper region and a lower hemispherically-shaped region;
    an equalization line which fluidly connects the upper region of the main pipe to the upper region of the measurement chamber and which equalizes air pressure in the main pipe and the measurement chamber;
    a sample line which fluidly connects the lower region of the main pipe to the lower region of the measurement chamber, such that a fluid level is established in the measurement chamber at the same elevation as a fluid level in the main pipe;
    a drain line connected to the lower region of the measurement chamber, a valve controlling the drain line;
    means in the measurement chamber for generating a signal indicative of the fluid level in the measurement chamber; and
    means for transmitting the signal to a control room of said nuclear power plant.

19. The fluid level monitor of claim 18, wherein the lower region of the measurement chamber is a hemisphere.

20. The fluid level monitor of claim 19, wherein the sample line connects to the measurement chamber just above the hemispherical lower region.

* * * * *